UNITED STATES PATENT OFFICE.

MARTIN KLEINSTÜCK, OF DRESDEN, GERMANY.

PROCESS OF ARTIFICIALLY SEASONING WOOD.

1,210,491.  Specification of Letters Patent.  Patented Jan. 2, 1917.

No Drawing.  Application filed March 19, 1914.  Serial No. 825,779.

*To all whom it may concern:*

Be it known that I, MARTIN KLEINSTÜCK, a citizen of Germany, residing at Dresden, Germany, have invented new and useful Improvements in Processes of Artificially Seasoning Wood, of which the following is a specification.

This invention relates to a process of seasoning wood by artificial means and has for its object to shorten the time required for the seasoning of wood by subjecting the same to the reaction of certain chemicals in gaseous form.

The natural drying of wood is not merely a physical process of evaporation of the water contained in the wood, but certain chemical processes take place at the same time. These chemical processes may conveniently be called condensation—reactions in the sense of the organic synthesis. As a result of this condensation reaction—presumably under elimination of water—high molecular organic compounds are gradually formed, as shown by the fact that the albumin substances become insoluble. The exact nature of these chemical changes taking place in the wood during the seasoning, ripening or aging process is, however, not known. I have found that this seasoning process may be effected or accelerated by artificial means. The wood is subjected, in my process, in a closed vessel to the reaction in gaseous form of such chemicals as are advantageously used in the organic synthesis to obtain high molecular compounds. The most important chemicals used for this purpose are the primary oxidation products of alcohol, i. e. aldehydes and ketones. For my present process formaldehyde is preferably used; good results are also obtained with acrolein and aceton. These chemicals so react on the readily convertible substances of the wood, especially the tannins, albumins and carbohydrates, that high-molecular stable compounds are formed while water is eliminated. This process of artificially seasoning wood also results in preserving the same. Even though these antiseptic chemicals do not remain as such in the wood but undergo chemical changes therein, so that an impregnation of the wood, properly speaking, does not take place, yet a preserving effect is obtained. This may be explained by the fact that the unstable substances are converted into stable or nearly stable substances before the process of decomposition has time to destroy the organic substances.

If in addition to the above mentioned chemicals condensing or catalytic agents are used in carrying out my process, the result will be still more pronounced. Primarily the aliphatic and aromatic amins may be used as such additional agents, provided, however, that they are of a volatile nature. Thus diethylamin can be used economically for this purpose. Even though all these substances are rather expensive, yet the total expense of carrying out my process is not materially increased thereby, because only an exceedingly small amount thereof (about 1% of the amount of the chemicals above referred to) is required.

I recommend as giving particularly good results, the employment, in connection with formaldehyde, of ammonia to assist the desired reaction. As a result of the simultaneous use of these two substances methylamin is formed according to the following formula:

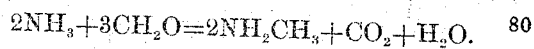

$$2NH_3 + 3CH_2O = 2NH_2CH_3 + CO_2 + H_2O.$$

This reaction has great practical advantages because the methylamin becomes effective *in statu nascendi*, the result of which is an extremely powerful catalytic action.

It is obvious that the formaldehyde must be used in excess as its function is not only to combine with the ammonia to produce the catalytic agent, but in addition thereto the formaldehyde should react directly upon the organic substances.

The amount of the various agents to be employed in carrying out my process must necessarily vary with the nature and condition of the wood to be treated. The amount of chemicals necessary to bring about the desired result will largely depend upon the amount of water contained in the wood. No fixed rule, however, can be laid down regarding the amount of the various substances to be used in the practical operation of my process, but experiments with samples of the wood to be treated and chemical tests of the wood after treatment will indicate when the desired reactions are substantially completed.

In carrying out my process on a commercial scale it will be advisable to use the formaldehyde in its powdered form as trioxymethylene, as this is easily converted into gas. Moreover if formalin is used water will be generated during the process, which is not the case when trioxymethylene is used.

In most cases a drying of the wood will be necessary in connection with the carrying out of my process, even if only for the purpose of removing from the wood the water resulting from what we have called the condensation process. Thus my process may advantageously be carried on at an artificially raised temperature. The increase in temperature will at the same time assist the evaporation of the reaction agents and will also favorably influence the reaction process. The necessary increase in temperature may be obtained by admitting into the reaction vessel superheated steam which will be transformed into saturated steam by the water drawn out of the wood. If conditions are such that the application of a high degree of heat seems inadvisable the process may be advantageously carried out at less than atmospheric pressure, as with reduced pressure evaporation will take place at a correspondingly lower temperature. In other cases it may be advisable to operate under excess pressure to shorten the time required for a complete penetration of the wood by the gases.

I claim:

1. The process of artificially seasoning wood which comprises converting the unstable constituents of the wood into high-molecular compounds by subjecting the wood to the reaction of a chemical, in its gaseous form, such as is advantageously used in the organic synthesis to obtain high-molecular compounds, substantially as and for the purpose described.

2. The process of artificially seasoning wood which comprises transforming the tannins, albumins and carbohydrates into high-molecular compounds by treating the wood with a primary oxidation product of alcohols in its gaseous form, substantially as and for the purpose described.

3. The process of artificially seasoning wood which comprises transforming the tannins, albumins and carbohydrates into high-molecular compounds by treating the wood with an aldehyde in its gaseous form, substantially as and for the purpose described.

4. The process of artificially seasoning wood which comprises transforming the tannins, albumins and carbohydrates into high-molecular compounds by treating the wood with a chemical, in its gaseous form, such as is advantageously used in the organic synthesis to obtain high-molecular compounds, and a catalytic agent, substantially as and for the purpose described.

5. The process of artificially seasoning wood which comprises transforming the tannins, albumins and carbohydrates into high-molecular compounds by treating the wood with a chemical, in its gaseous form, such as is advantageously used in the organic synthesis to obtain high-molecular compounds, and a volatile amin, substantially as and for the purpose described.

6. The process of artificially seasoning wood which comprises transforming the tannins, albumins and carbohydrates into high-molecular compounds by treating the wood with formaldehyde and ammonia, the amount of formaldehyde being in excess of the amount needed to convert the ammonia into methylamin, substantially as and for the purpose described.

In testimony whereof I have hereunto set my hand in the presence of two subscribing witnesses.

MARTIN KLEINSTÜCK.

Witnesses:
 LEO BERGHOLZ,
 PAUL ARRAS.